United States Patent Office 3,022,305
Patented Feb. 20, 1962

3,022,305
PROCESS FOR PREPARING PYRIDAZINE DERIVATIVES AND NOVEL FLUORINE-CONTAINING PYRIDAZINE DERIVATIVES
Rudolph A. Carboni, Wilmington, Del., assignor to E. I. du Pont de Nemours and Company, Wilmington, Del., a corporation of Delaware
No Drawing. Filed June 17, 1957, Ser. No. 666,254
14 Claims. (Cl. 260—250)

This invention relates to a new process of preparing pyridazine derivatives. It also relates to certain new, fluorine-containing pyridazine derivatives.

Pyridazine derivatives, that is compounds containing the pyridazine, or 1,2-diazine, nucleus,

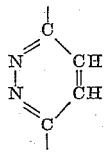

have not been extensively studied, primarily because of the dearth of general methods for their synthesis. A method generally applicable to the preparation of a large variety of pyridazines and dihydropyridazines would be highly desirable.

This application is a continuation-in-part of my copending patent application Serial No. 579,432, filed April 20, 1956, now Patent No. 2,817,662; issued December 24, 1957.

It is an object of this invention to provide a new process for preparing pyridazine derivatives and certain new fluorine-containing pyridazine derivatives. A further object of this invention is to prepare a large variety of pyridazines and dihydropyridazines in a simple manner through an entirely new reaction of broad scope. A still further object of this invention is the synthesis of new fluorine-containing pyridazine derivatives employing a few steps and starting from certain fluoroolefins which are now readily available. Other objects will appear hereinafter.

These and other objects of this invention are accomplished by the following process for preparing pyridazine derivatives which comprises bringing into contact and reacting a 3,6-disubstituted-s-tetrazine, wherein the substituents are free from non-aromatic unsaturation (i.e., are aliphatically saturated) with a compound having aliphatic open-chain or alicyclic carbon-to-carbon unsaturation, said compound being more precisely defined below, and obtaining as the resulting product a pyridazine derivative which is a molar adduct of the two reactants, less one mole of nitrogen per mole of tetrazine reacted. This adduct has the structure of a substituted dihydropyridazine or of a substituted pyridazine. In general, only one mole of 3,6-disubstituted-s-tetrazine reacts, even when the unsaturated reactant has more than one carbon-to-carbon multiple bond, and in such cases the reaction product is a 1:1 molar adduct, less one mole of nitrogen. In some cases, however, an unsaturate having more than one multiple bond, e.g. bicyclo-[2.2.1]heptadiene, adds one mole of tetrazine to each of the multiple bonds, with loss of one mole of nitrogen per mole of tetrazine reacted.

This invention also comprises, as new products, fluorine-containing derivatives of pyridazine which are molar adducts, less one mole of nitrogen per mole of tetrazine reacted, of a compound having aliphatic or alicyclic carbon-to-carbon unsaturation (as more precisely defined below) and a 3,6-bis-fluoroalkyl-s-tetrazine in which each fluoroalkyl radical has at least one hydrogen atom attached to the carbon atom alpha to the tetrazine ring. These new pyridazine derivatives are obtained by reacting a 3,6-bis-fluoroalkyl-s-tetrazine having hydrogen on the carbon atom alpha to the tetrazine ring with a compound having aliphatic or alicyclic unsaturation as defined below, and isolating the resulting adduct.

The unsaturated compounds suitable for reaction with the 3,6-disubstituted-s-tetrazines in accordance with this invention are the compounds having aliphatic, open-chain or alicyclic carbon-to-carbon unsaturation of the class of terminal methylene, $CH_2{=}$; intracyclic vinylene,

—CH=CH— and ethynylene, —C≡C—, and in which all but at most one of the radicals attached to multiply bonded carbon atoms are hydrogen or hydrocarbon radicals.

For the sake of brevity, the suitable unsaturated compounds will often be referred to simply as the unsaturates or the unsaturated compounds in the discussion which follows.

The reaction leading to pyridazine derivatives is an entirely new one. Its mechanism is not known with certainty, but it appears to involve as a first step the formation of an adduct in a manner somewhat analogous to the well-known Diels-Alder reaction. In this reaction scheme, the tetrazine functions as the diene, while the unsaturated compound acts as the dienophile. The intermediate product loses a molecule of nitrogen at once, and the final product is a molar adduct, generally a 1:1 molar adduct of the tetrazine and the unsaturate, less one molecule of nitrogen per mole of tetrazine reactant. This product contains the pyridazine (1,2-diazine) skeleton.

The reaction is represented by the following equations, using for illustrative purposes a 3,6-disubstituted-s-tetrazine of the formula

where the R's are substituents free from aliphatic unsaturation (these substituents take no part in the reaction) and an ethylenically unsaturated compound $$R_1—CH=CH_2$$

wherein $R_1$ is hydrogen or a substituent, e.g. a hydrocarbon radical:

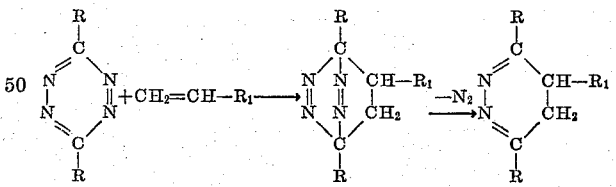

wherein $R_1$ is a substituent corresponding to $R_1$ in the ethylenically unsaturated compound employed.

The end product as represented above is a 3,4,6-trisubstituted-4,5-dihydropyridazine. However, whenever the unsaturate used is such that the resulting adduct has hydrogen on either or both of the carbon atoms in the 4- and 5-positions, infra-red spectral analysis shows one or two peaks in the —NH region of the spectrum. This indicates that the compounds are tautomeric mixtures containing also one or more of the isomers.

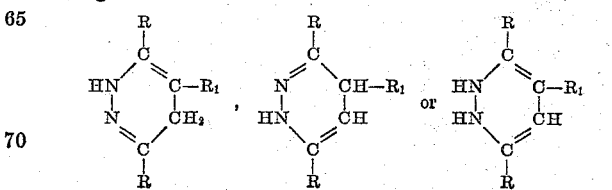

These are also 3,6-disubstituted dihydropyridazines, which, depending on the ethylenically unsaturated compound used, may also have substituents on either or both of the 4- and 5-carbon atoms. In view of these tautomeric possibilities, the structure of the products obtainable by this process cannot be rigorously defined as one form in most cases. Their general nature of dihydropyridazine derivatives is however proved (in addition to the analytical and spectral evidence) by the fact that treatment with oxidizing agents leads to substituted pyridazines.

When the unsaturate reacted with the 3,6-disubstituted tetrazine is an acetylenic, rather than an ethylenic compound, a similar addition with loss of nitrogen takes place. In such a case, however, the final reaction product is a 3,6-disubstituted pyridazine of the general formula

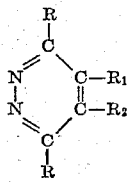

where $R_1$ and $R_2$ are hydrogen or substituents, corresponding to the substituents $R_1$ and $R_2$ in the acetylenic compound $R_1$—C≡C—$R_2$.

When the unsaturate used is allene, $CH_2$=C=$CH_2$, or an allenic compound which has hydrogen on either of the terminal carbon atoms, the adduct is found to have a pyridazine structure, rather than the isomeric dihydropyridazine structure. With allene, for example, the adduct actually obtained is a 4-methylpyridazine,

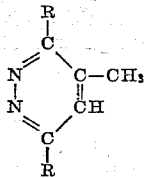

The heterocyclic starting materials employed in the practice of this invention are the 3,6-disubstituted-s-tetrazines. A new and important class of 3,6-disubstituted-s-tetrazines, viz., the 3,6-bis-fluoroalkyl-s-tetrazines, has recently become available. These compounds, which have the general formula

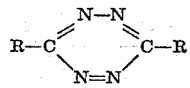

where R is a fluoroalkyl radical having at least one hydrogen atom on the carbon adjacent to the tetrazine ring, are described and claimed in my U.S. patent application Ser. No. 579,432, filed on April 20, 1956, now Patent No. 2,817,662, issued December 24, 1957. They are prepared by reacting a 1,1-difluoro-1-alkene of the formula

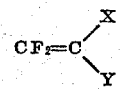

where X is hydrogen or fluorine and Y is fluorine, alkyl or fluoroalkyl (with the proviso that when Y is alkyl, X is fluorine) with hydrazine, and oxidizing the 1,2-dihydro-3,6-bis-fluoroalkyl-s-tetrazine thus formed to the 3,6-bis-fluoroalkyl-s-tetrazine. This reaction may be represented by the following equations:

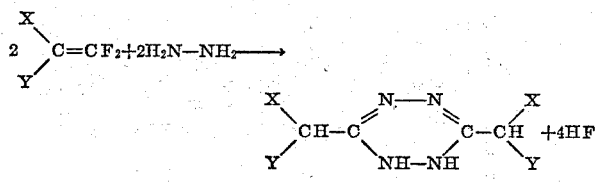

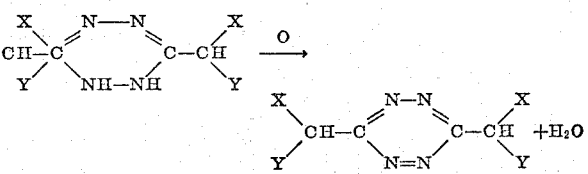

Because of their ready accessibility by the above-described method, and of their reactivity, the 3,6-bis-fluoroalkyl-s-tetrazines are preferred starting materials in the process of this invention. Particularly preferred are the 3,6-bis(polyfluoroalkyl)-s-tetrazines in which the substituents contain from 1 to 13 carbon atoms and at least two fluorine atoms.

The other reactant can be any compound having aliphatic open-chain or alicyclic carbon-to-carbon unsaturation, provided that either open-chain aliphatic unsaturation is present in the form of a terminal methylene group, $H_2C$=, or of an ethynylene group, —C≡C—; or alicyclic aliphatic unsaturation is present as a vinylene group, —CH=CH—, which is part of the alicyclic ring. A further requirement is that not more than one of the radicals attached to multiply bonded carbon atoms be other than hydrogen or hydrocarbon. This remaining one radical attached to multiply bonded carbon, if not hydrogen or hydrocarbon, can be any atom or atomic group, e.g., a halogen atom (fluorine, chlorine, bromine or iodine), or an inorganic (carbon-free) group such as nitro, sulfo and the like, or an organic group such as cyano, carboxyl, carbalkoxy, carbaryloxy, carbonamido, acid halide, acyl, acyloxy, alkoxy, aryloxy, oxygen-, sulfur- or nitrogen-interrupted hydrocarbon, aldehydo, acetal, and the like. The other radicals attached to the multiply bonded carbon atoms can be hydrogen or any hydrocarbon group, saturated or unsaturated, e.g., alkyl, alkenyl, cycloalkyl, aryl, aralkyl groups etc. In the case of compounds having intracyclic vinylene unsaturation, the alicyclic ring is, of course, attached to both doubly bonded carbons and is considered a single radical. The unsaturated compound can have more than one unsaturated center, as illustrated in several of the examples which follow.

There are, of course, variations in the reactivity of the unsaturates. For this reason, and for reasons of accessibility, those unsaturates (ethylenic or acetylenic) which contain from 2 to 18 carbon atoms are preferred. Within this class the more useful and therefore preferred unsaturates are those belonging to the following groups:

(a) Ethylenic compounds of the general formula

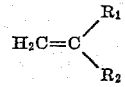

where $R_1$ is hydrogen or hydrocarbon of 1–6 carbon atoms and $R_2$ is hydrocarbon of 1–6 carbon atoms or one of the groups —CN, —CHO, —CH(OR$_3$)$_2$, —COOH, —COOR$_3$ and —OR$_3$ wherein $R_3$ is a hydrocarbon group free from aliphatic unsaturation of 1–8 carbon atoms.

(b) Alicyclic hydrocarbons of 5–10 carbon atoms having from 1 to 2 intracyclic vinylene groups.

(c) Mono- or disubstituted acetylenic hydrocarbons of 2–14 carbon atoms.

The conditions for the reaction between the tetrazine and the unsaturate are not critical. It is preferred, although not essential, to use a slight to moderate excess of the unsaturate, e.g., between 1.1 and 3 moles, or more if desired, of the unsaturate per mole of tetrazine, in order to utilize all of the latter and facilitate the subsequent isolation of the adduct. The order of addition of the reactants is immaterial. The reaction is in general exothermic and will therefore proceed at room temperature or below, e.g., at —10° C. With the less reactive starting materials it may be desirable to apply external heat, for example, up to 150° C. The most useful temperature range is that between about 20 and about 100° C.

A solvent or diluent is not necessary, but can be used to facilitate contact, particularly when both reactants are solid. For this purpose, any inert organic liquid free from aliphatic unsaturation can be used, including diethyl ether, di-n-butyl ether, pentane, heptane, cyclohexane, benzene, toluene, or the like. The reaction is normally carried out at atmospheric pressure but closed vessels can be used, particularly when the unsaturate is gaseous or low boiling. Completion of the reaction can readily be determined either through disappearance of the characteristic red color of the s-tetrazine or through substantial cessation of nitrogen evolution. It is not, of course, essential that the reaction be carried out to completion.

The reaction products are high boiling liquids or crystalline solids which can be isolated from the mixture, after the excess unsaturate, if any, has been removed, by conventional procedures, e.g., fractional distillation or crystallization from an appropriate solvent or by both methods. The dihydropyridazines can be oxidized to the corresponding pyridazines by any of the usual oxidizing agents, such as potassium dichromate in acetic acid.

The following examples illustrate the invention:

Example I

A 4-g. sample of 3,6-bis(1,2,2,2-tetrafluoroethyl)-s-tetrazine,

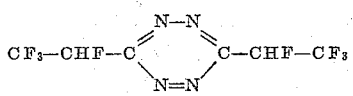

was slowly added to an excess of isoprene at 5–10° C. An immediate reaction occurred with evolution of heat and of nitrogen, and the red color of the tetrazine disappeared. When the addition was completed, the excess isoprene was removed by evaporation and the yellowish residual liquid was fractionated. There was obtained 2.4 g. of a colorless oil, B.P. 57° C. at 0.75 mm., $n_D^{25}$ 1.4078, which had the composition of a 1:1 molar adduct of 3,6-bis(1,2,2,2-tetrafluoroethyl)-s-tetrazine and isoprene less one mole of nitrogen.

Analysis.—Calcd. for $C_{11}H_{10}F_8N_2$: C, 41.00; H, 3.13; N, 8.70; F, 47.18; mol. wt., 322. Found: C, 40.94; H, 3.13; N, 9.05; F, 48.13; mol. wt., 323.

The product was indicated to be a mixture of 3,6-bis-(1,2,2,2 - tetrafluoroethyl) - 4 - methyl - 4 - vinyl - 4,5-dihydropyridazine,

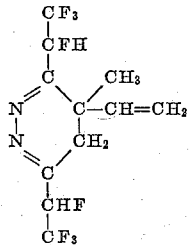

with its tautomers.

The 3,6-bis(1,2,2,2-tetrafluoroethyl)-s-tetrazine used as the starting material in this example and in several of the following examples was prepared as described in my U.S. patent application Ser. No. 579,432, filed April 20, 1956, now Patent No. 2,817,662, issued December 24, 1957. A specific preparation of this compound is as follows: A mixture of 50 g. of hydrazine hydrate, 75 g. of hexafluoropropene and 100 ml. of water is heated at 100° C. for 5 hours in a silver-lined bomb. The reaction product consists of an aqueous layer and a black, water-insoluble semi-solid. Extraction of the latter with chloroform followed by concentration of the extract yields the yellow, crystalline 1,2-dihydro-3,6-bis(1,2,2,2-tetrafluoroethyl)-s-tetrazine,

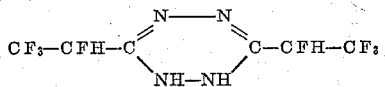

M.P. 104–109° C. Upon treatment of this product with an oxidizing mixture of 2.0 g. of concentrated nitric acid, 2.0 g. of sulfuric acid and 5 ml. of water, the red color of the tetrazine appears immediately. The mixture is heated periodically to about 100° C. over a 15-minute period. On cooling, the red crystalline 3,6-bis(1,2,2,2-tetrafluoroethyl)-s-tetrazine separates. It is collected by filtration and recrystallized from petroleum ether, after which it melts at 67–70° C.

Example II

To 3 g. of styrene was added gradually a solution of 3,6-bis(1,2,2,2-tetrafluoroethyl)-s-tetrazine in a mixture of diethyl ether and pentane. An immediate reaction occurred with the gradual disappearance of the red tetrazine color and the evolution of nitrogen. Toward the end of the addition the mixture was gently heated to the boiling point of the solvents to complete the reaction, and some fresh pentane was added to the warm mixture. On cooling, well-defined, colorless crystals separated. This crop (0.9 g.) was recrystallized from a 5:1 pentane/ether mixture. The recrystallized product melted at 131–132.5° C. and had the composition of a 1:1 molar adduct of 3,6-bis(1,2,2,2-tetrafluoroethyl)-s-tetrazine and styrene less one mole of nitrogen. Infrared and compositional analysis indicated that this product was a mixture of 3,6-bis(1,2,2,2-tetrafluoroethyl)-4-phenyl-4,5 - dihydropyridazine with its tautomers.

Analysis.—Calcd. for $C_{14}C_{10}F_8N_2$: C, 46.96; H, 2.81; N, 7.82; F, 42.43; mol. wt., 358. Found: C, 47.54; H, 2.90; N, 8.00; F, 42.12; mol. wt., 365.

The dihydropyridazine derivative was oxidized to a pyridazine as follows: To a solution of 3.6 g. of the adduct in 20 ml. of glacial acetic acid was added 1 g. of potassium dichromate dihydrate in 30 ml. of 65% aqueous acetic acid. The mixture was heated on a steam bath for 10 minutes and poured into a four-fold volume of ice water. The aqueous mixture was extracted with ether, the ether extract was washed with water, dried over anhydrous sodium sulfate and evaporated to dryness. There remained an oily product which crystallized on standing. Fractional crystallization from aqueous alcohol yielded 3,6-bis(1,2,2,2-tetrafluoroethyl) - 4-phenylpyridazine,

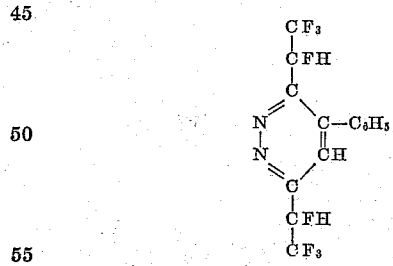

as colorless crystals, M.P. 65–67° C.

Analysis.—Calcd. for $C_{14}H_8F_8N_2$: N, 7.87. Found: N, 7.78.

The structure of this material was confirmed by its infrared spectrum, which showed that the N—H bands had disappeared and which was in agreement with a pyridazine structure.

Example III

A pentane-ether solution of 3,6-bis-(1,2,2,2-tetrafluoroethyl)-s-tetrazine was gradually added to 5 g. of α-methylstyrene, and the mixture was warmed to reflux for one-half hour with occasional shaking. Some fresh pentane was added during the reaction. On cooling, a crop of colorless crystals separated, which was recrystallized from a pentane-ether mixture to yield 1.5 g. of crystalline reaction product, M.P. 101–103° C. This material had the composition of 1:1 molar adduct of 3,6-bis(1,2,2,2-tetrafluoroethyl)-s-tetrazine and α-methylstyrene minus one mole of nitrogen, and was indicated to be a mixture of 3,6-bis(1,2,2,2-tetrafluoroethyl) - 4-methyl-4-phenyl-4,5-dihydropyridazine and its tautomers.

*Analysis.*—Calcd. for $C_{15}H_{12}F_8N_2$: C, 48.39; H, 3.25; N, 7.53; F, 40.83. Found: C, 48.87; H, 3.48; N, 7.96; F, 40.69.

Example IV

To 5 g. of 2,3-dimethyl-1,3-butadiene was added 5 g. of 3,6-bis(1,2,2,2-tetrafluoroethyl)-s-tetrazine in two portions. After each addition a slightly exothermic reaction occurred, with the evolution of nitrogen and the disappearance of the red tetrazine color. The mixture was heated at 50° C. for a few minutes, then allowed to stand overnight at room temperature. Fractionation of the reaction product yielded 3.7 g. of a colorless liquid distillate boiling at 74–76° C. at 1.1 mm., $n_D^{25}$ 1.4198. This material had the composition of a 1:1 molar adduct of 3,6-bis(1,2,2,2,-tetrafluoroethyl-s-tetrazine and 2,3-dimethyl-1,3-butadiene less one mole of nitrogen and was indicated to be a mixture of 3,6-bis(1,2,2,2-tetrafluoroethyl)-4-methyl-4-isopropenyl-4,5-dihydropyridazine,

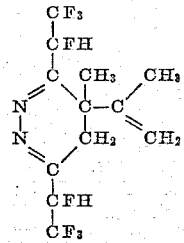

and its tautomers.

*Analysis.*—Calcd. for $C_{12}H_{12}N_2F_8$: C, 42.86; H, 3.60; N, 8.33; F, 45.21. Found: C, 43.10; H, 3.56; N, 8.86; F, 45.36.

Example V

Gaseous 1,3-butadiene was bubbled into an ethereal solution of 3,6-bis(1,2,2,2-tetrafluoroethyl)-s-tetrazine until the red tetrazine color had been essentially discharged. The reaction was slightly exothermic. The product, a mixture of 3,6-bis(1,2,2,2-tetrafluoroethyl)-4-vinyl-4,5-dihydropyridazine with its tautomers, was allowed to stand overnight at room temperature, after which the excess 1,3-butadiene and the ether were removed by evaporation, leaving an almost colorless crystalline residue. Spectral data indicated for this adduct of 3,6-bis(1,2,2,2-tetrafluoroethyl)-s-tetrazine and 1,3-butadiene, less one mole of nitrogen, a structure similar to that of the isoprene adduct of Example I and the 2,3-dimethyl-1,3-butadiene adduct of Example IV.

A 3.4 g. sample of this product was oxidized with 2 g. of potassium dichromate as described in Example II for the styrene adduct. There was obtained 1.6 g. of 3,6-bis(1,2,2,2-tetrafluoroethyl)-4-vinylpyridazine,

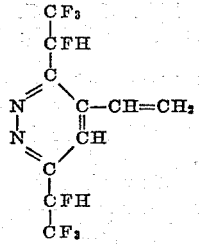

as an oil boiling at 65° C. at 0.9 mm.

*Analysis.*—Calcd. for $C_{10}H_6F_8N_2$: N, 9.15. Found: N, 9.02.

Infrared and ultraviolet spectral data were in agreement with this structure.

Example VI

A mixture of 9 g. of 3,6-bis(1,2,2,2-tetrafluoroethyl)-s-tetrazine with an excess (25 ml.) of cyclohexene was heated at reflux for three hours, during which time the color changed gradually from red to yellow and nitrogen was evolved. The excess cyclohexene was removed by distillation, leaving a residual oil which was extracted with pentane. From the pentane extract a solid separated, which was recrystallized from pentane. This product was a 1:1 molar adduct of 3,6-bis(1,2,2,2-tetrafluoroethyl)-s-tetrazine and cyclohexene, less a molecule of nitrogen, and was indicated to be a mixture of tetrahydrobenzo(d) - 3,6 - bis(1,2,2,2 - tetrafluoroethyl) - 4,5 - dihydropyridazine,

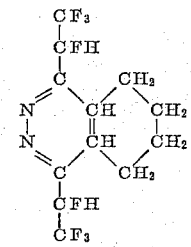

with its tautomers.

*Analysis.*—Calcd for $C_{12}H_{12}N_2F_8$: N, 8.33. Found: N, 8.21.

Example VII

A solution of 3,6-bis(1,2,2,2-tetrafluoroethyl)-s-tetrazine in excess acrylonitrile was heated at reflux for two days, during which the red tetrazine color gradually disappeared. The excess acrylonitrile was removed by distillation. The viscous, oily residue was triturated with methylene chloride. On concentrating the methylene chloride extract, a crop of oily crystals separated. This was recrystallized from a methylene chloride/petroleum ether mixture to give the 1:1 molar adduct of 3,6-bis(1,2,2,2-tetrafluoroethyl)-s-tetrazine and acrylonitrile, less a mole of nitrogen, this product being indicated to be a mixture of 3,6-bis(1,2,2,2-tetrafluoroethyl)-4-cyano-4,5-dihydropyridazine with its tautomers.

*Analysis.*—Calcd. for $C_9H_5N_3F_8$: N, 13.68. Found: N, 13.54.

Example VIII

A mixture of 4 g. of allene, 10 g. of 3,6-bis(1,2,2,2-tetrafluoroethyl)-s-tetrazine and 40 ml. of diethyl ether was heated in a bomb at 100° C. for 7 hours. The reaction product, which still contained some unchanged tetrazine as shown by its red color, was fractionated through a small spinning band column. The main fraction, which boiled at 66° C. at 1.6 mm., had the composition corresponding to a 1:1 molar adduct of 3,6-bis(1,2,2,2-tetrafluoroethyl)-s-tetrazine and allene less one mole of nitrogen.

*Analysis.*—Calcd. for $C_9H_6N_2F_8$: C, 36.75; H, 2.06; N, 9.53. Found: C, 35.95;; H, 2.29; N, 9.69.

Infrared, ultraviolet and nuclear magnetic resonance spectra indicated that this product was 3,6-bis(1,2,2,2-tetrafluoroethyl)-4-methylpyridazine,

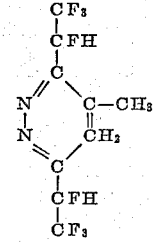

Example IX

A mixture of 10 g. of 3,6-diphenyl-s-tetrazine,

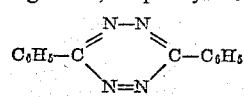

50 ml. of acrylonitrile and 50 ml. of toluene was heated at 100° C. for 5 days. The red-violet color of the tetrazine diminished appreciably during this period. On cooling the mixture, there separated a first crop (6.1 g.) of yellow crystals, M.P. 190–191° C., which analyzed for a 1:1 molar adduct of 3,6-diphenyl-s-tetrazine and acrylonitrile less one mole of nitrogen.

*Analysis.*—Calcd. for $C_{17}H_{13}N_3$: C, 78.74; H, 5.05; N, 16.21. Found: C, 78.44; H, 5.04; N, 15.95.

When the mother liquor was concentrated and cooled an additional crop of the same crystalline material was obtained.

The adduct (a mixture of 3,6-diphenyl-4-cyano-4,5-dihydropyridazine and its tautomers) was oxidized to the corresponding pyridazine as follows: A mixture of 2.6 g. of the adduct and 1.2 g. (one oxygen equivalent) of potassium dichromate hydrate in 50 ml. of acetic acid and 10 ml. of water was heated at 100° C. for one hour. On cooling the solution, there was obtained 2.2 g. of 3,6-diphenyl-4-cyanopyridazine, M.P. 162–163° C.,

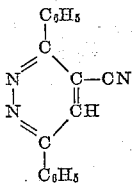

*Analysis.*—Calcd. for $C_{17}H_{11}N_3$: C, 79.36; H, 4.31; N, 16.33. Found: C, 78.50; H, 4.13; N, 15.95.

This structure was confirmed by spectral data.

*Example X*

A mixture of 11.7 g. of 3,6-diphenyl-s-tetrazine, 26 g. of redistilled styrene and 25 ml. of toluene was heated to 100° C. with stirring. At this temperature, the reaction proceeded briskly with the evolution of nitrogen and the disappearance of the red-violet tetrazine color, and it was completed within 15–20 minutes. The mixture was cooled to room temperature, whereupon a mass of bright yellow crystals (12 g.) separated, M.P. 182–186° C.

*Analysis.*—Calcd. for $C_{22}H_{18}N_2$: C, 85.13; H, 5.84; N, 9.03. Found: C, 83.81; H, 5.61; N, 9.71.

Elemental analysis indicated that the product was predominantly a 1:1 molar adduct of 3,6-diphenyl-s-tetrazine and styrene, less one mole of nitrogen (3,4,6-triphenyl-4,5-dihydropyridazine and its tautomers). However, it was contaminated with some 3,6-diphenyldihydrotetrazine, as shown by the fact that treatment of the solid crystalline material with concentrated nitric acid gave a red-violet color indicative of the presence of some 3,6-diphenyldihydrotetrazine. The presence of 3,6-diphenyldihydrotetrazine may be accounted for by an oxidation-reduction reaction between the triphenyldihydropyridazine which formed and the as yet unreacted 3,6-diphenyl-s-tetrazine in accordance with the following scheme:

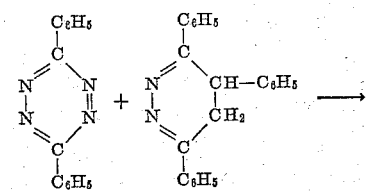

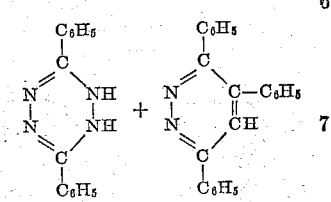

The presence of small amounts of 1,2-dihydro-3,6-diphenyl-s-tetrazine in the reaction product was confirmed by the following oxidation experiment. A 4.7 g. sample of the 3,6-diphenyl-s-tetrazine/styrene reaction product, M.P. 182–186° C., was gently heated with a solution of 2 g. of chromium trioxide in 125 ml. of acetic acid. On cooling the reaction mixture there was obtained, and separated by filtration, a small crop (0.25 g.) of red-violet 3,6-diphenyl-s-tetrazine, M.P. 195–197° C., presumably formed by oxidation of the 1,2-dihydro-3,6-diphenyl-s-tetrazine present. When the acetic acid filtrate was poured into ice water a solid precipitated. Fractional crystallization of this solid in ethanol yielded successive crops of the 3,4,6-triphenyl-pyridazine, M.P. 176–177.5° C. The structure of this product was further confirmed by the fact that it is identical with the product, obtained directly by the reaction of 3,6-diphenyl-s-tetrazine and phenylacetylene, which is described in the next example.

*Example XI*

A mixture of 2.5 g. of 3,6-diphenyl-s-tetrazine, 5.1 g. of phenylacetylene and 10 g. of xylene was heated at reflux for about 16 hours, during which period nitrogen was evolved and the red-violet color of the tetrazine disappeared. On cooling the mixture to room temperature, a solid reaction product (2.3 g.) separated. Recrystallization of this material from ethanol yielded 3,4,6-triphenyl-pyridazine as colorless plates, M.P. 176–177.5° C. The melting point was not depressed on admixture with a sample of the oxidation product (M.P. 176–177.5° C.) of the 3,6-diphenyl-s-tetrazine/styrene reaction product described in Example X.

*Example XII*

A mixture of 1 g. of 3,6-diphenyl-s-tetrazine, 0.85 g. of diphenylacetylene and 25 ml. of toluene was heated at reflux for several days. The solution, which had then lost its red color, was concentrated and cooled. There was obtained 1.15 g. of colorless crystalline product, M.P. 196–197° C., analyzing for 3,4,5,6-tetraphenyl-pyridazine,

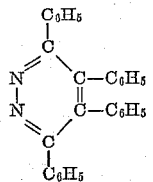

*Analysis.*—Calcd. for $C_{28}H_{20}N_2$: C, 87.47; H, 5.24; N, 7.29. Found: C, 87.33; H, 5.36; N, 7.32.

*Example XIII*

A mixture of 5 g. of 3,6-diphenyl-s-tetrazine and 35 ml. of benzene was heated in the presence of an excess of acetylene in a pressure vessel at 150° C. for 16 hours. Colorless, glistening crystals (4.5 g.) were collected by filtration of the reaction mixture. After recrystallization from ethanol these crystals melted at 234–236° C. Elemental and spectral analyses indicated that this product was 3,6-diphenylpyridazine,

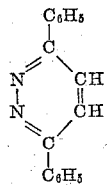

*Analysis.*—Calcd. for $C_{16}H_{12}N_2$: C, 82.73; H, 5.21; N, 12.06. Found: C, 82.75; H, 5.26; N, 11.84.

Example XIV

A mixture of 3 g. of 3,6-diphenyl-s-tetrazine and 15 ml. of bicyclo(2.2.1)hepta-2,5-diene,

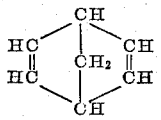

hereinafter called bicycloheptadiene for the sake of brevity, was heated to about 75° C. After 10 minutes, the red tetrazine color had disappeared with evolution of nitrogen. The reaction product, which was a mixture of solid and liquid, was diluted with 20 ml. of diethyl ether and filtered. The collected solid was recrystallized from 20 ml. of dimethyl formamide. There was thus obtained 2.5 g. of colorless plates, M.P. 225–225.5° C.

Elemental and spectral analyses showed that this material was an addition product of two moles of 3,6-diphenyl-s-tetrazine to one mole of bicycloheptadiene, with loss of two moles of nitrogen. This product was accordingly a mixture of di(3,6-diphenylpyridazino)bicyclo[2.2.1]-heptane

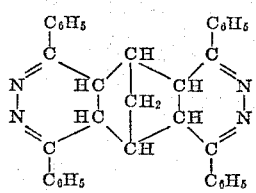

with its tautomers.

*Analysis.*—Calcd. for $C_{35}H_{28}N_4$: C, 83.50; H, 5.59; N, 11.11. Found: C, 83.43; H, 5.30; N, 11.92.

Example XV

To a solution of 5.7 g. of 3,6-bis-(1,2,2,2-tetrafluoroethyl)-s-tetrazine in 15 ml. of diethyl ether was added gradually 1 g. of bicycloheptadiene. A vigorous reaction occurred with the evolution of nitrogen. The reaction mixture was then heated on a steam bath for 15 minutes. Evaporation of the solvent left as the residue an oily solid which was triturated with a mixture of diethyl ether and petroleum ether. The insoluble solid which remained was recrystallized from benzene to yield a yellow, grainy crystalline product melting at 204–210° C.

Elemental and spectral analyses showed that this material was an addition product of two moles of 3,6-bis-(1,2,2,2-tetrafluoroethyl)-s-tetrazine to one mole of bicycloheptadiene, with the loss of two moles of nitrogen. It was a mixture of di[(3,6-tetrafluoroethyl)pyridazino]-bicyclo[2.2.1]-heptane,

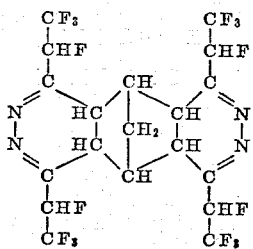

with its tautomers.

*Analysis.*—Calcd. for $C_{19}H_{12}F_{16}N_4$: F, 50.66; N, 9.33. Found: F, 49.44; N, 9.45.

Example XVI

To an excess of cyclopentene was added 0.15 g. of 3,6-bis(1,2,2,2-tetrafluoroethyl)-s-tetrazine. An exothermic reaction ensued with evolution of nitrogen. After one hour, the pale yellow solution was filtered to remove a small quantity of solid. The filtrate was evaporated to dryness, leaving a yellow crystalline material which, after recrystallization from petroleum ether, melted at 86–88° C. Elemental and spectral analysis showed that this was a 1:1 molar adduct, with the loss of one mole of nitrogen, of 3,6-bis(1,2,2,2-tetrafluoroethyl)-s-tetrazine and cyclopentene, and was indicated to be a mixture of 4,5-trimethylene-3,6-bis(1,2,2,2-tetrafluoroethyl)pyridazine

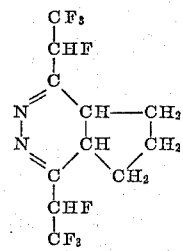

with its tautomers.

*Analysis.*—Calcd. for $C_{11}H_{10}F_8N_2$: F, 47.17. Found, F, 46.29.

In the series of examples tabulated below, an excess of the designated unsaturate was treated with 3,6-bis(1,2,2,2-tetrafluoroethyl)-s-tetrazine. Under the conditions noted, the characteristic red color of the tetrazine disappeared completely with evolution of nitrogen and formation of adducts as described in the preceding examples.

| Example | Unsaturate | Conditions |
|---|---|---|
| XVII | Isobutyl vinyl ether<br>$CH_2=CH—O—CH_2—CH(CH_3)_2$ | Reaction proceeded vigorously at room temperature. |
| XVIII | 1-Heptene<br>$CH_2=CH—(CH_2)_4—CH_3$ | Heating for 5 minutes at 80–90° C. |
| XIX | 1,5-Hexadiene<br>$CH_2=CH—CH_2—CH_2—CH=CH_2$ | Do. |
| XX | Acrolein diethyl acetal<br>$CH_2=CH—CH(OC_2H_5)_2$ | Refluxing for 2 minutes. |
| XXI | Acrolein<br>$CH_2=CH—CHO$ | Heating at about 100° C. for 6 hours. Yellow crystals formed. |

While this invention has been illustrated in the preceding examples by the use of certain specific tetrazines and unsaturates, it is broadly applicable to the reaction, with formation of a molar adduct and the loss of one mole of nitrogen per mole of tetrazine reactant, of 3,6-disubstituted-s-tetrazines in which the substituents are free from non-aromatic unsaturation with compounds having aliphatic and alicyclic carbon-to-carbon unsaturation, as herein defined. Thus, any of the 3,6-disubstituted-s-tetrazines described in the literature can be used, including for example, those in which the substituents are methyl, ethyl, phenyl, bromophenyl, nitrophenyl, carboxyphenyl, p-tolyl, naphthyl, benzyl, etc. For the reasons already noted, the 3,6-bis(fluoroalkyl)-s-tetrazines of my application Ser. No. 579,432, now Patent No. 2,817,662, issued December 24, 1957, are of special interest as starting materials. Illustrative of these compounds are, besides the 3,6-bis(1,2,2,2-tetrafluoroethyl)-s-tetrazine of the examples, the 3,6-disubstituted-s-tetrazines where the substituents are difluoromethyl, $HCF_2$—;
fluoromethyl, $CH_2F$—;
2,2,2-trifluoroethyl, $CF_3$—$CH_2$—;
1-hydroperfluoropropyl, $C_2F_5$—CFH—;
1-hydroperfluorohexyl, $C_5F_{11}$—CFH—;
1,7-dihydroperfluoroheptyl, $H(CF_2)_6$—CFH—;
1,11-dihydrodihydroperfluoroundecyl, $H(CF_2)_{10}$—CFH—;
1-fluoroethyl, $CH_3$—CFH—;
1-fluoro-n-pentyl, $C_4H_9$—CFH—;
1-fluoro-n-tridecyl, $C_{12}H_{25}$—CFH—; and the like.

From the standpoint of operating the process of this invention, the nature of the substituents attached to the carbon atoms of the tetrazine ring is largely immaterial since these aliphatically saturated substituents do not participate in the reaction. It is preferred for practical reasons of accessibility that the substituents be radicals having from 1 to 13 carbon atoms, and more specifically hydrocarbon or halohydrocarbon radicals free from non-aromatic unsaturation.

Among the suitable unsaturated compounds, in addition to those used in the examples, may be mentioned among the ethylenic compounds ethylene, propylene, isobutylene, 1-undecene, 1-octadecene, 1,1-diphenylethylene, vinylnaphthalene, vinylcyclohexane, alpha-methylacrolein, alpha-phenylacrolein, acrolein di(n-hexyl)acetal, acrylic acid, methacrylic acid, vinylacrylic acid, alpha-phenylacrylic acid, ethyl acrylate, methyl methacrylate, methacrylonitrile, alpha-phenylacrylonitrile, phenyl vinyl ether, alpha-naphthyl vinyl ether, divinyl ether, acrylyl chloride, methy vinyl ketone, phenyl vinyl ketone, methacrylamide, vinyl chloride, vinyl fluoride, p-tolyl vinyl sulfone, vinylsulfonic acid, nitroethylene, alpha-nitrostyrene, allyl alcohol, allyl chloride, vinyl acetate, vinyl butyrate, and the like; among the alicyclic compounds, cyclopentadiene, 1,4-cyclohexadiene, dihydronaphthalene, 2,5-dihydrothiophene, dihydrothiophene oxide, 2,5-dihydrofuran, pyrroline, and the like; and among the acetylenic compounds, methylacetylene, ethylacetylene, vinylacetylene, diethylacetylene, phenylbenzoylacetylene, propiolic acid, phenylpropiolic acid, methyl propiolate, butyne-2-oic acid, propargyl alcohol, propargyl aldehyde, and the like.

A new class of pyridazine derivatives is made available by this invention. These are the molar adducts, less one mole of nitrogen per mole of tetrazine reacted, of compounds having carbon-to-carbon aliphatic or alicyclic unsaturation, as previously defined, with the 3,6-bis(fluoroalkyl)-s-tetrazines having hydrogen on the carbon atoms adjacent to the tetrazine ring. The preferred products of this class are those obtained from 3,6-bis(polyfluoroalkyl)-s-tetrazines in which the substituents contain from 1 to 13 carbon atoms and at least two fluorine atoms, and from unsaturates, of the type defined, having from 2 to 18 carbon atoms, in particular the more preferred unsaturates defined above before the examples under (a), (b) and (c).

Specific examples of the new compounds of this invention are the molar adducts, less one mole of nitrogen per mole of tetrazine reacted, of 3,6-bis(difluoromethyl)-s-tetrazine with isobutylene, methylacetylene, acrylic acid and cyclohexene; of 3,6-bis(fluoromethyl)-s-tetrazine with vinyl ethyl ether, vinyl chloride and phenylacetylene; of 3,6-bis(2,2,2-trifluoroethyl)-s-tetrazine with methyl methacrylate, 1,4-dihydronaphthalene and methyl propiolate; of 3,6-bis(1-hydroperfluoropropyl)-s-tetrazine with p-tolylvinylsulfone, acrylic acid, methacrylonitrile, cyclopentadiene and acetylene; of 3,6-bis(1-hydroperfluorohexyl)-s-tetrazine with acrylyl chloride, bicycloheptadiene and alpha-naphthylacetylene; of 3,6-bis(1,7-dihydroperfluoroheptyl)-s-tetrazine with alpha-phenylacrylonitrile, acrolein, cyclopentene, allyl alcohol and propargyl aldehyde; of 3,6-bis(1,11-dihydroperfluoroundecyl)-s-tetrazine with methacrolein, methacrylamide and phenylpropiolic acid; of 3,6-bis(1-fluoroethyl)-s-tetrazine with alpha-nitrostyrene, cyclohexene, phenyl vinyl ether and ethyl acrylate; of 3,6-bis(1-fluoro-n-pentyl)-s-tetrazine with vinyl acetate, 4-methylcyclohexene and diphenylacetylene; of 3,6-bis(1-fluoro-n-tridecyl)-s-tetrazine with acrolein dimethyl acetal, acrylonitrile and diethylacetylene; and the like.

These new pyridazine derivatives are useful as polymerization stabilizers (inhibitors) for light-polymerizable unsaturates. This stabilizing action was demonstrated as follows, using three samples, A, B, and C of freshly distilled styrene. Sample A, with stabilizer, was kept at room temperature in ordinary diffuse light. Sample B, without stabilizer, was exposed to a source of ultraviolet light. To sample C was added 1% by weight of the 3,6-bis(1,2,2,2-tetrafluoroethyl)-4-methyl-4-vinyldihydropyridazine of Example I, and this sample was exposed to ultraviolet light side by side with sample B. After two hours' exposure, sample B had taken on a pronounced viscosity, while sample C was no more viscous than sample A. After 24 hours' exposure, sample B had set to a thick nearly unpourable liquid while sample C was still mobile and readily pourable. A similar stabilizing action occurs with other 3,6-bis(fluoroalkyl)pyridazine derivatives of this invention and other light-polymerizable unsaturates.

The products of this invention are also useful as antioxidants for fats such as vegetable oils and hydrocarbon fuels such as gasoline.

In addition to making pyridazine derivatives available, the process of this invention is useful in analytical or control processes in testing for the presence, and determining the amounts of aliphatically unsaturated compounds in mixtures containing them. For example, nearly quantitative separation of mixtures of saturated and unsaturated hydrocarbons boiling close to one another, e.g., n-butane and butene-1 can be obtained by treatment with a 3,6-disubstituted-s-tetrazine, whereby the unsaturated compound enters in combination, leaving the saturated one uncombined. For this purpose, it is advantageous to use a 3,6-bis(fluoroalkyl)-s-tetrazine in view of the greater availability and improved stability of these compounds. The disappearance of the intense tetrazine color or by reaction with an unsaturated compound can also be used as a qualitative color test for the presence of the latter, provided no reducing agents are present in the mixture being tested.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Compounds selected from the group consisting of those having the formula

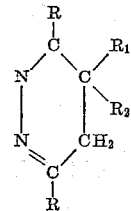

and tautomeric forms thereof, wherein R is a fluoroalkyl radical of 1–13 carbon atoms having at least one hydrogen atom attached to the carbon atom alpha to the heterocyclic ring; $R_1$ is a member of the class consisting of hydrogen and hydrocarbon of 1–6 carbon atoms, and $R_2$ is a radical of the class consisting of hydrocarbon of 1–6 carbon atoms, —CN, —CHO, —CH(OR_3)_2, —COOH, —COOR_3 and —OR_3, $R_3$ being a hydrocarbon group free from aliphatic unsaturation of 1–6 carbon atoms; and those having the formula

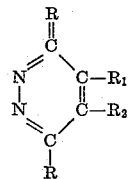

wherein R has the same significance as above and $R_1$ and $R_2$ are members of the class consisting of hydrogen and hydrocarbon radicals, the sum of the carbon atoms in $R_1$ and $R_2$ together being at most 12.

2. Mixture of 3,6-bis(1,2,2,2-tetrafluoroethyl)-4-methyl-4-vinyl-4,5-dihydropyridazine and its tautomers.

3. 3,6 - bis(1,2,2,2 - Tetrafluoroethyl) - 4 - phenyl-pyridazine.

4. Mixture of 3,6 - bis(1,2,2,2 - tetrafluoroethyl) - 4-methyl-4-phenyl-4,5-dihydropyridazine and its tautomers.

5. Mixture of 3,6 - bis(1,2,2,2 - tetrafluoroethyl) - 4-methyl - 4 - isopropenyl - 4, 5 - dihydropyridazine and its tautomers.

6. 3,6 - bis(1,2,2,2-Tetrafluoroethyl) - 4 - vinyl - pyridazine.

7. Mixture of 3,6 - bis(1,2,2,2 - tetrafluoroethyl) - 4-cyano-4,5-dihydropyridazine and its tautomers.

8. 3,6 - bis(1,2,2,2-Tetrafluoroethyl) - 4 - methyl - pyridazine.

9. Process for preparing pyridazine derivatives which comprises bringing into contact and reacting within a temperature range of −10° to 150° C. a 3,6-disubstituted-s-tetrazine, wherein the substituents on the 3,6-positions are members of the class consisting of hydrocarbon and halohydrocarbon groups of from 1–13 carbon atoms, said groups being free from non-aromatic unsaturation, with a compound having not more than 18 carbon atoms and having aliphatic carbon-to-carbon unsaturation of the class consisting of terminal methylene, intracyclic vinylene and ethynylene unsaturation, said compound being further characterized by having as one of the radicals attached to multiply bonded carbon atoms a monovalent substituent and by having all other such radicals selected from a class consisting of hydrogen and hydrocarbon radicals.

10. Process for preparing pyridazine derivatives which comprises bringing into contact and reacting within a temperature range of −10° to 150° C. an aliphatically unsaturated hydrocarbon of not more than 18 carbon atoms having a terminal methylene group with a 3,6-disubstituted-s-tetrazine, wherein the substituents in the 3,6-positions are selected from the class consisting of hydrocarbon and halohydrocarbon groups of not more than 13 carbon atoms, said groups being free from non-aromatic unsaturation.

11. Process for preparing pyridazine derivatives which comprises bringing into contact and reacting within a temperature range of −10° to 150° C. an ethylenic compound of the formula

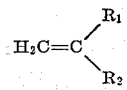

wherein $R_1$ is a member of the class consisting of hydrogen and hydrocarbon of from 1–6 carbon atoms and $R_2$ is a member of the class consisting of hydrocarbon radicals of from 1–6 carbons, —CN, —CHO, —CH(OR$_3$)$_2$, —COOH, —COOR$_3$ and —OR$_3$, $R_3$ being a hydrocarbon group free from aliphatic unsaturation of 1–6 carbon atoms, with a 3,6-disubstituted-s-tetrazine wherein the substituents in the 3,6-positions are selected from the class consisting of hydrocarbon and halohydrocarbon radicals of 1–13 carbon atoms and free from non-aromatic unsaturation.

12. Process for preparing pyridazine derivatives which comprises bringing into contact and reacting within a temperature range of −10° to 150° C. an alicyclic hydrocarbon of from 5 to 10 carbon atoms, said hydrocarbon having from 1 to 2 intracyclic vinylene groups, with a 3,6-disubstituted-s-tetrazine wherein the substituents in the 3,6-positions are free from non-aromatic unsaturation and are selected from the class consisting of hydrocarbon and halohydrocarbon radicals of 1–13 carbon atoms.

13. Process for preparing pyridazine derivatives which comprises bringing into contact and reacting within a temperature range of −10° to 150° C. an acetylenically unsaturated hydrocarbon having from 2–14 carbon atoms with a 3,6-disubstituted-s-tetrazine wherein the substituents in the 3,6-positions are selected from the class consisting of hydrocarbon and halohydrocarbon radicals of 1–13 carbon atoms, said radicals being free from non-aromatic unsaturation.

14. Process for preparing a fluorine-containing pyridazine derivative which comprises bringing into contact and reacting within a temperature range of −10° to 150° C. a 3,6-bis-fluoroalkyl-s-tetrazine in which each fluoroalkyl radical contains not more than 13 carbon atoms and has at least one hydrogen atom attached to the carbon atom alpha to the tetrazine ring, with a compound of not more than 18 carbon atoms and having aliphatic carbon-to-carbon unsaturation of the class consisting of terminal methylene, intracyclic vinylene and ethynylene unsaturation, said compound being further characterized by having as one of the radicals attached to multiply bonded carbon atoms a monovalent substituent and by having all other such radicals selected from a class consisting of hydrogen and hydrocarbon radicals.

References Cited in the file of this patent
UNITED STATES PATENTS
2,817,662     Carboni _____ Dec. 24, 1957

UNITED STATES PATENT OFFICE
CERTIFICATE OF CORRECTION

Patent No. 3,022,305              February 20, 1962

Rudolph A. Carboni

It is hereby certified that error appears in the above numbered patent requiring correction and that the said Letters Patent should read as corrected below.

Column 14, lines 41 to 49, the formula should appear as shown below instead of as in the patent:

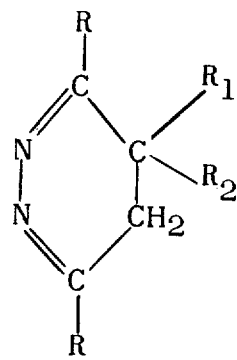

same column 14, lines 61 to 68, the formula should appear as shown below instead of as in the patent:

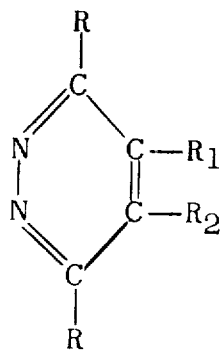

column 15, lines 8 and 9, for "pyridaz ne" read -- pyridazine --.

Signed and sealed this 9th day of October 1962.

(SEAL)
Attest:

ERNEST W. SWIDER
Attesting Officer

DAVID L. LADD
Commissioner of Patents